(12) United States Patent  (10) Patent No.: US 9,090,270 B2
Bartonek  (45) Date of Patent: Jul. 28, 2015

(54) SPEED SENSITIVE DRAGGING EQUIPMENT DETECTOR

(71) Applicant: Progress Rail Services Corporation, Albertville, AL (US)

(72) Inventor: Mark Joseph Bartonek, Blue Springs, MO (US)

(73) Assignee: Progress Rail Services Corporation, Albertville, AL (US)

( * ) Notice: Subject to any disclaimer, the term of this patent is extended or adjusted under 35 U.S.C. 154(b) by 20 days.

(21) Appl. No.: 13/659,169

(22) Filed: Oct. 24, 2012

(65) Prior Publication Data

US 2014/0110535 A1  Apr. 24, 2014

(51) Int. Cl.
G01M 7/00 (2006.01)
B61L 27/00 (2006.01)
B61L 1/20 (2006.01)

(52) U.S. Cl.
CPC ............. *B61L 27/0094* (2013.01); *B61L 1/20* (2013.01); *G01M 7/00* (2013.01)

(58) Field of Classification Search
CPC ......... B61L 1/20; B61L 27/0094; G01M 7/00
See application file for complete search history.

(56) References Cited

U.S. PATENT DOCUMENTS

| 2,662,973 | A | 12/1953 | McGowan et al. |
| 2,691,722 | A | 10/1954 | Lewis |
| 2,963,575 | A | 12/1960 | Pelino et al. |
| 2,993,988 | A | 7/1961 | Post et al. |
| 3,546,448 | A * | 12/1970 | Pelino ........................... 246/246 |
| 3,558,875 | A | 1/1971 | Gieskieng |
| 3,558,876 | A | 1/1971 | Tillman et al. |
| 4,129,276 | A | 12/1978 | Svet |
| 4,379,330 | A | 4/1983 | Sanville |
| 4,696,446 | A | 9/1987 | Mochizuki et al. |
| 4,702,104 | A | 10/1987 | Hallberg |
| 4,895,324 | A | 1/1990 | Buckles |

(Continued)

FOREIGN PATENT DOCUMENTS

| CN | 201296264 | 8/2009 |
| DE | 4325018 | 3/1994 |

(Continued)

OTHER PUBLICATIONS

U.S. Appl. No. 13/658,998 of Mark Joseph Bartonek et al., entitled "Flat Wheel Detector With Multiple Sensors" filed Oct. 24, 2012.

(Continued)

*Primary Examiner* — John Q Nguyen
*Assistant Examiner* — Michael Kerrigan
(74) *Attorney, Agent, or Firm* — Finnegan, Henderson, Farabow, Garrett & Dunner, LLP

(57) ABSTRACT

The disclosure is directed to a method of detecting an object beneath a train. The method may include receiving a first signal indicative of a speed of the train, receiving a second signal indicative of a three generated by impact of the object with an impact element, and selecting a threshold value based on the speed of the train. The method may also include processing the second signal in accordance with a first procedure if the first signal indicates a speed of the train less than the threshold level, and processing the second signal in accordance with a second procedure different from the first procedure if the first signal is equal to or greater than the threshold level.

20 Claims, 5 Drawing Sheets

(56) References Cited

U.S. PATENT DOCUMENTS

| | | |
|---|---|---|
| 5,150,618 A | 9/1992 | Bambara |
| 5,433,111 A | 7/1995 | Hershey et al. |
| 5,462,244 A | 10/1995 | Van Der Hoek et al. |
| 5,699,986 A * | 12/1997 | Welk .............. 246/125 |
| 5,743,495 A | 4/1998 | Welles, II et al. |
| 5,793,492 A | 8/1998 | Vanaki |
| 6,412,332 B1 * | 7/2002 | Bartonek .............. 73/12.01 |
| 6,768,551 B2 | 7/2004 | Mian et al. |
| 6,909,514 B2 | 6/2005 | Nayebi |
| 6,951,132 B2 | 10/2005 | Davenport et al. |
| 7,292,144 B2 | 11/2007 | Ballinger |
| 7,861,979 B2 | 1/2011 | Beaman |
| 7,937,192 B2 | 5/2011 | Lueger et al. |
| 8,006,559 B2 | 8/2011 | Mian et al. |
| 8,430,363 B2 | 4/2013 | Hesser et al. |
| 2003/0072001 A1 | 4/2003 | Mian et al. |
| 2006/0076461 A1 * | 4/2006 | DeRose et al. .......... 246/122 R |
| 2011/0118899 A1 | 5/2011 | Brooks et al. |
| 2011/0118914 A1 | 5/2011 | Brooks et al. |

FOREIGN PATENT DOCUMENTS

| | | |
|---|---|---|
| JP | 2008-58256 | 3/2008 |
| JP | 2008-240473 | 10/2008 |
| WO | WO 2007/009132 | 1/2007 |
| WO | WO 2010/000850 | 1/2010 |

OTHER PUBLICATIONS

U.S. Appl. No. 13/659,262 of Mark Joseph Bartonek, entitled "Multi-Function Dragger" filed Oct. 24, 2012.

U.S. Appl. No. 13/659,199 of Mark Joseph Bartonek, entitled "System and Method for Characterizing Dragging Equipment" filed Oct. 24, 2012.

* cited by examiner

SPEED SENSITIVE DRAGGING EQUIPMENT DETECTOR

TECHNICAL YIELD

The present disclosure is directed to a dragging equipment detector and, more particularly, to a speed-sensitive dragging equipment detector.

BACKGROUND

Detection systems for the railroad industry provide methods and apparatus for detecting dragging, or otherwise improperly hanging or protruding vehicle equipment or objects when a train passes by a monitoring station. Existing systems for detecting dragging equipment underneath trains include sensors mounted on stationary strike plates or impact elements in the path of the protruding equipment. Impacts of protruding equipment against the stationary impact elements cause vibrations in the impact elements and in the sensors mounted thereon. Systems or apparatus for detecting the presence of objects dragging beneath a train are sometimes referred to as "draggers". In various implementations, draggers are placed at twenty mile intervals, ten mile intervals, or other spaced intervals along stretches of railroad track, in addition to being placed at railroad crossings and in railroad switching yards. If a dragging object, or otherwise improperly protruding equipment, is detected by a dragger, the train is stopped so that the object can be secured or removed to reduce the potential for derailment or other problems. Because of the expense and inconvenience of stopping a train frequently to secure low-risk objects, a system and method is needed for accurately detecting and characterizing dragging objects under a variety of conditions and train speeds so that the train will only be stopped when absolutely necessary to prevent derailment.

One problem associated with existing impact detection systems involves the triggering of false alarms. In some situations, false alarms can be triggered because the impact detection system does not adjust or compensate for different conditions under which detection of impacts is being performed, and therefore does not provide an accurate characterization of the impact. A failure to accurately identify or characterize the type of detected impact can occur if the sensors used to detect the impacts are not able to adjust or compensate for the range of conditions that affect the magnitude of impact forces. A sensor may be expected to accurately detect impact forces generated by equipment being dragged by a train traveling at a variety of speeds, from very slowly at speeds of 1-20 miles per hour, to fast speeds in excess of 60 miles per hour.

One attempt to avoid the problem of triggering false alarms is disclosed in U.S. Pat. No. 6,412,332 to M. Bartonek that issued on Jul. 2, 2002 (the '332 patent). The '332 patent discloses an apparatus for detecting objects dragging beneath a train as the train travels along a rail. The apparatus includes a stationary impact element rigidly supported along the rail, with a single axis sensor disposed in a horizontal orientation relative to the impact element to detect only horizontal components of any impact forces.

Although the impact detection system of the '332 patent may eliminate detection of vertical forces, and therefore reduce the detection of vibrations from flat wheels, this solution for selective detection of only impacts that create horizontal forces may provide a less than optimal impact detection system. In particular, the impact detection system of the '332 patent does not adjust for different conditions under which detection of impacts is being performed.

The disclosed dragging equipment detector is directed to overcoming one or more of the problems set forth above and/or other problems in the art.

SUMMARY

In one aspect, the present disclosure is directed to a method of detecting an object beneath a train. The method may include receiving a first signal indicative of a speed of the train, and receiving a second signal indicative of a force generated by impact of the object with an impact element. The method may also include selecting a threshold level based on the speed of the train. The method may further include processing the second signal in accordance with a first procedure if the first signal is less than the threshold level, and processing the second signal in accordance with a second procedure different from the first procedure if the first signal is equal to or greater than the threshold level.

In another aspect of the disclosure, an apparatus is provided for detecting an object beneath a train. The apparatus may include an impact element configured to be disposed in a path of the object, and a sensor configured to sense an impact on the impact element. The apparatus may also include a speed detector configured to detect a speed of the train. The apparatus may further include a processor configured to receive a first signal from the sensor indicative of a force generated by impact of the object with the impact element, receive a second signal from the speed detector indicative of the speed of the train, determine a threshold value based on the speed of the train, implement a first procedure on the first signal when the speed is less than the threshold value, and implement a second procedure different from the first procedure on the first signal when the speed is equal to or greater than the threshold value.

DETAILED DESCRIPTION

Figure 1:
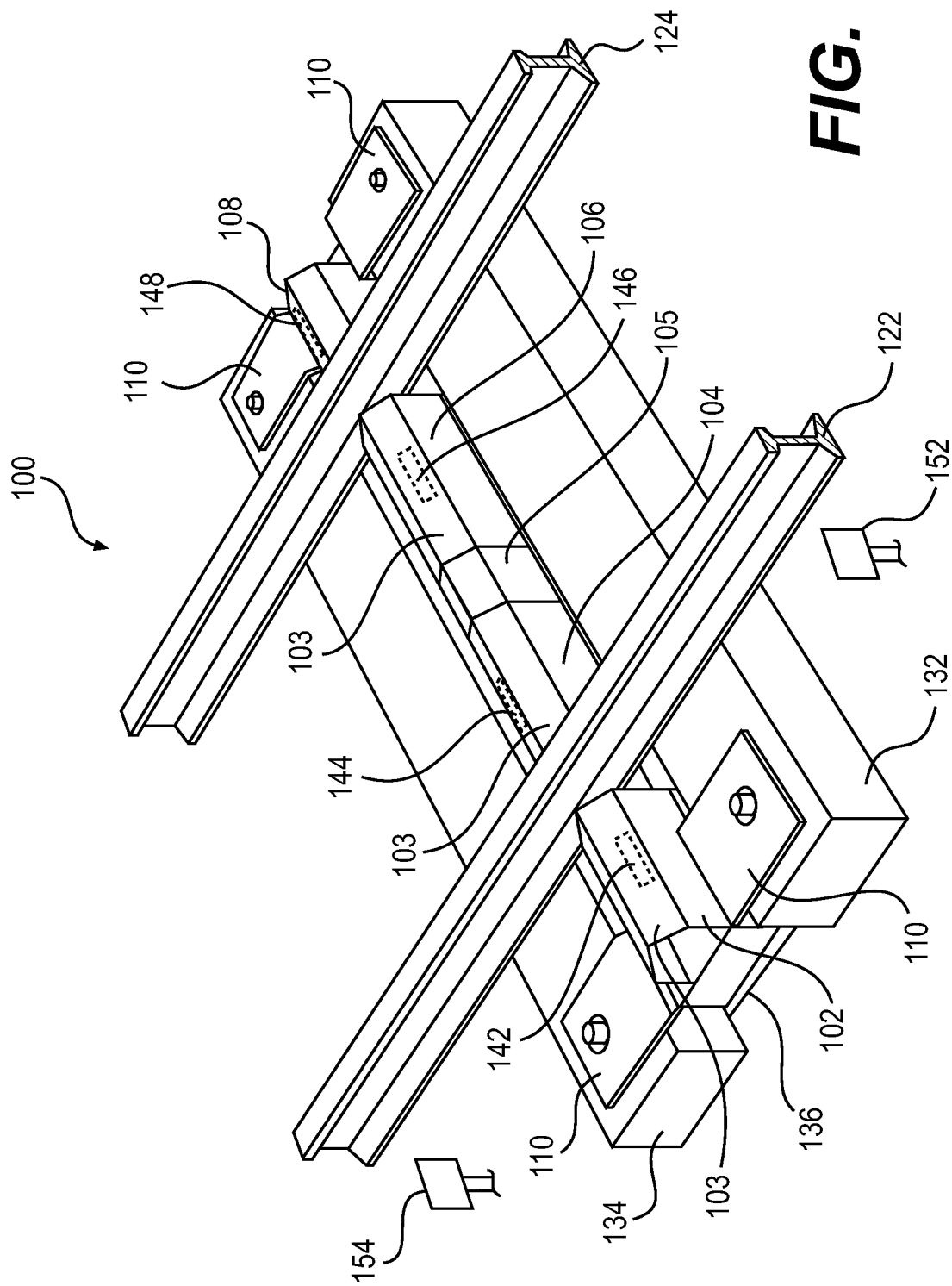
FIG. 1 is a perspective view of an exemplary apparatus for detecting dragging equipment.
Figure 2:
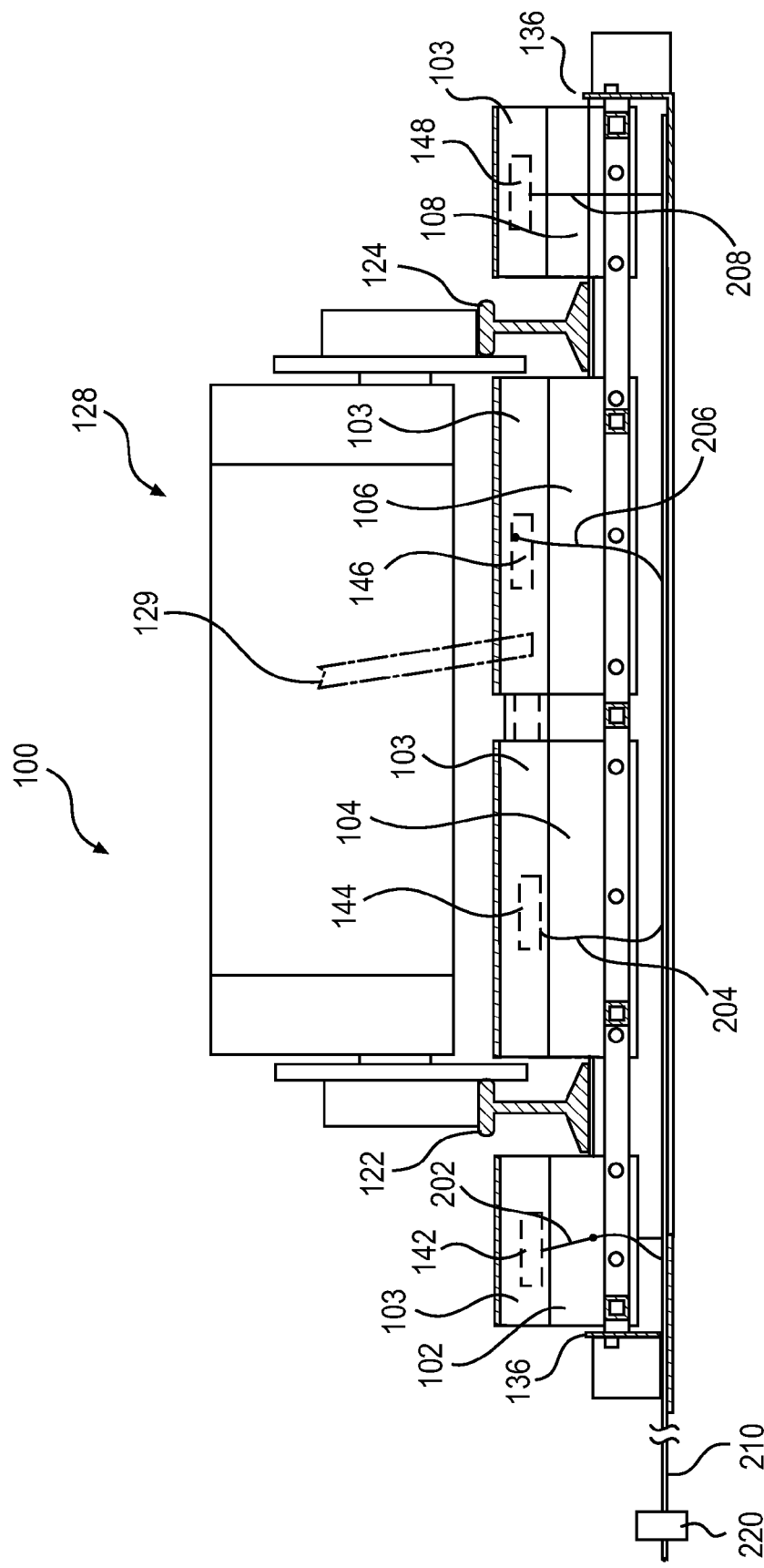
FIG. 2 is an elevation view of the exemplary apparatus shown in FIG. 1.

FIGS. 1 and 2 illustrate an apparatus 100 for detecting an object 129 protruding beneath, hanging below, dragging beneath, or otherwise improperly extending from train 128 in the direction of a train track or train rails 122, 124. Apparatus 100, shown in FIGS. 1 and 2, and partially in cross-section in FIG. 3, comprises one or more stationary impact elements 102, 104, 106, 108. One disclosed implementation may include two stationary impact elements 104, 106, which are located in between train rails 122, 124, and two stationary impact elements 102, 108, which are located outside of train rail 122 and train rail 124, respectively. The two stationary impact elements 104, 106 located in between train rails 122, 124 may be rigidly coupled together with a connector plate 105, or may each be separated with no connection therebetween.

Stationary impact elements 102, 104, 106, 108 may be supported in various ways. They may be mounted in a frame 136 disposed below rails 122, 124, and between a pair of ties 132, 134. Ties 132, 134 are generally orthogonal to rails 122, 124, positioned on a layer of ballast, and extending below rails 122, 124 to support rails 122, 124. Ties 132, 134 may be made from a variety of different materials including wood, cement, or composite materials. In alternative implementations, stationary impact elements 102, 104, 106, 108 may be attached directly to ties 132, 134. Impact elements 102, 104, 106, 108 may be fastened to frame 136 with flange bolts and/or studs and nuts, or otherwise joined to frame 136. Frame 136 may be fastened to ties 132, 134 with a pair of U-tie brackets 110, or other shaped brackets or structures.

Figure 3:
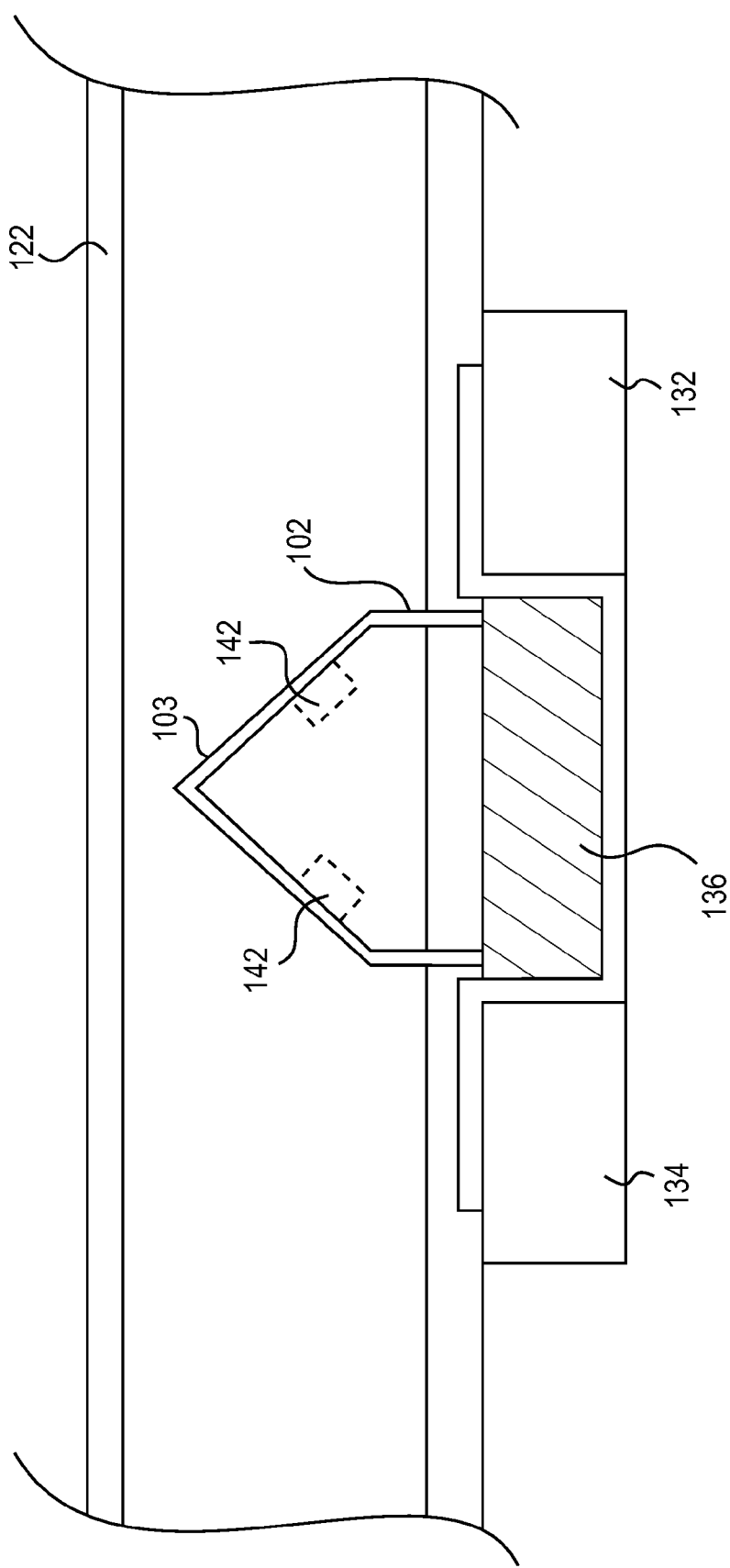
FIG. 3 is a side sectional view of the exemplary apparatus shown in FIGS. 1 and 2.

As shown in FIGS. 1, 2, and 3, each impact element 102, 104, 106, 108 may be formed from a single piece of rigid material, such as steel plate, aluminum, or composite materials, or from multiple pieces of rigid material that are joined together. Each impact element 102, 104, 106, 108 may include generally vertical surfaces contiguous with one or more inclined angle impact surfaces 103 positioned generally in an area of potential impact with dragging objects or equipment protruding below a train. Impact elements 102, 104, 106, 108 may extend in a direction approximately orthogonal to a travel direction of train 128 and extending across rails 122, 124. Each impact element 102, 104, 106, 108 may also be oriented at an angle inclined to the travel direction of train 128, as shown in the perspective view of FIG. 1, or the sectional view of FIG. 3. The inclined angle of an impact surface 103 of each impact element 102, 104, 106, 108 may allow protruding or dragging equipment 129 hanging down from train 128 traveling along train rails 122, 124 to impact inclined angle impact surface 103 of each impact element 102, 104, 106, 108 and slide over the top of each impact element. The inclined angle configuration reduces the magnitude of normal components of the impact forces on each impact element 102, 104, 106, 108, thereby reducing the potential for the impact forces to destroy or seriously damage impact elements 102, 104, 106, 108. One of ordinary skill in the art will recognize that inclined angle impact surfaces 103 of impact elements 102, 104, 106, 108, may be configured to slope at various angles to horizontal and vertical, with various implementations having inclined angle impact surfaces 103 oriented at approximately 45 degrees to the travel direction of train 128. Other implementations may have an inclined angle surface of an impact element that is within the range of approximately 30 degrees to approximately 60 degrees to the direction of travel of train 128.

As shown in FIG. 1, one or more speed detectors 152, 154 may be positioned railside at one or more positions along one or both of rails 122, 124. Speed detectors 152,154 may be spaced along rails 122, 124 and configured to detect the position of train 128 as it passes each speed detector 152, 154, thereby enabling the calculation of train speed by measuring an elapsed time between detection of train 128 at each speed detector 152, 154. One of ordinary skill in the art will recognize that the speed of train 128 may be calculated in a number of different ways, including using other position location devices such as GPS tracking systems. Additionally, rotational speed sensors (not shown) may be provided on one or more axles of train 128 to detect the rotational speed of the axles, and a processor may then calculate the actual train speed from the rotational speed of the axles.

Each impact element 102, 104, 106, and 108 may house or support at least one impact sensor 142, 144, 146, and 148, respectively. Impact sensors 142, 144, 146, 148, illustrated in FIGS. 1, 2, and 3, may be oriented on respective impact elements 102, 104, 106, 108 in directions that allow each impact sensor 142, 144, 146, 148 to detect directional force components generated on each impact element 102, 104, 106, 108 when an object such as dragging equipment 129 impacts an impact element 102, 104, 106, 108. In various implementations impact sensors 142, 144, 146, 148 may be oriented generally parallel to the inclined angle impact surface 103 of each impact element 102, 104, 106, 108, extending generally horizontally across rails 122, 124, or impact sensors 142, 144, 146, 148 may be oriented at different angles to horizontal and vertical to allow a single sensor to detect force components in two or more orthogonal directions. Alternative implementations may also include multiple, single-axis impact sensors located on each of the impact elements, with each of the single-axis impact sensors oriented to detect a single directional force component of an impact force. The signals from multiple, single-axis impact sensors may then be combined to provide a complete characterization of the impact force. Impact sensors 142, 144, 146, 148 may be transducers that use the piezoelectric effect to generate charges proportional to accelerations generated by the impact of dragging equipment 129 with one or more impact elements 102, 104, 106, 108. An acceleration of a piezoelectric accelerometer may manifest itself as a force exerted on the accelerometer, which can be observed as a change in an electrostatic force or voltage generated by the piezoelectric accelerometer.

FIG. 3 illustrates one possible implementation, wherein impact sensor 142 is shown mounted on one or both inclined angle impact surfaces 103 of impact element 102. The dashed outline of impact sensor 142 is also shown in an alternative implementation contacting the inside surface of an oppositely facing inclined angle surface of impact element 102. In various implementations, one or more of impact sensors 142, 144, 146, 148 may be mounted on one or more of inclined angle impact surfaces 103 on either side of impact elements 102, 104, 106, 108 in order to be in position for detecting impacts when train 128 is traveling in either direction along rails 122, 124. Placement of impact sensors 142, 144, 146, 148 on the inside surface of respective impact elements 102, 104, 106, 108 may protect impact sensors 142, 144, 146, 148 from direct impact by an object 129 improperly protruding from train 128. One of ordinary skill in the art will recognize that there are various ways in which impact sensors 142, 144, 146, 148 may be mounted on impact elements 102, 104, 106, 108, including being imbedded in an impact element, contained within recesses in the impact elements, bonded to the impact elements with an epoxy or other adhesive materials, or contained within housings that are bolted to or otherwise joined to the impact elements.

Figure 4:
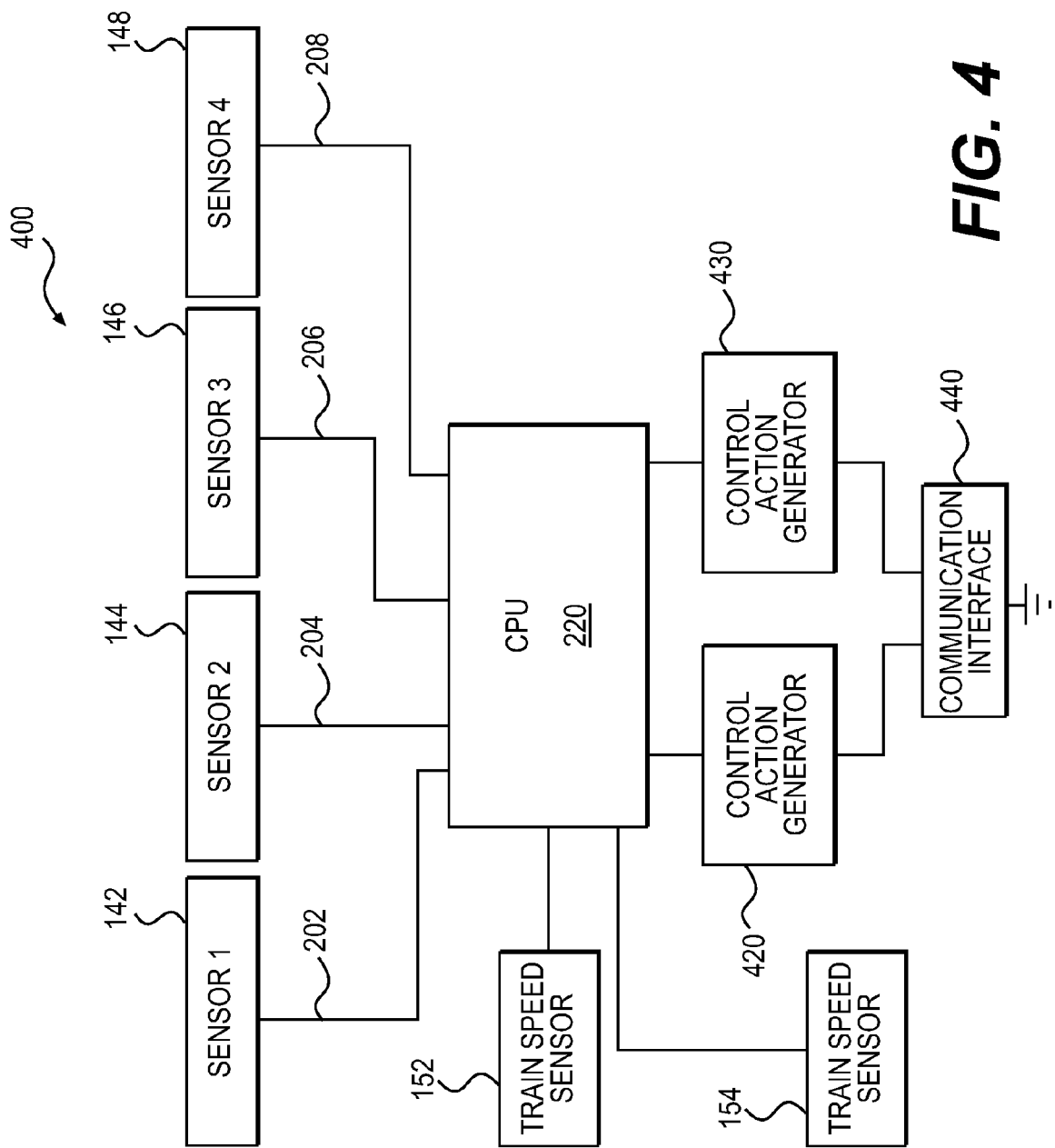
FIG. 4 is a block diagram of a detection circuit that may be used with the exemplary apparatus shown in FIGS. 1, 2, and 3.

FIG. 4 is a block diagram illustrating an arrangement for an exemplary detection circuit 400 that may be used with various implementations of the disclosure. Impact sensors 142, 144, 146, 148 may be connected by cables 202, 204, 206, 208, respectively (also shown in FIG. 2), through a conduit 210 to a CPU (central processing unit) 220. Alternatively, the sensors could be communicatively coupled to CPU 220 through various junction boxes, serial or parallel buses, wirelessly, or through an Ethernet connection. CPU 220 may be configured to receive acceleration signals from impact sensors 142, 144, 146, 148 that are indicative of the force generated by impact of dragging equipment 129 against one or more impact elements 102, 104, 106, 108. CPU 220 may also be configured to receive signals from speed detectors 152, 154, or other sensors (not shown) indicative of the speed that train 128 is traveling along rails 122, 124. CPU 220 may also be communicatively coupled to various control action generators 420, 430, each of which may be configured to issue specific control action commands based at least in part on the signals received from speed detectors 152, 154. A communication interface 440 may also be provided to receive the control actions from control action generators 420, 430, and convey those control actions to the proper entity.

One of ordinary skill in the art will recognize that although CPU 220 is illustrated as a single unit, the functionality provided by processor could be provided instead by one or more processors. The one or more processors may be part of a server, client, network infrastructure, mobile computing platform, or a stationary computing platform, one or more of which may be contained at a dispatch center, in a single wayside housing, multiple wayside housings, onboard a train, or at remote locations communicatively coupled over wired or wireless networks such as communication interface 440 in FIG. 4.

Figure 5:
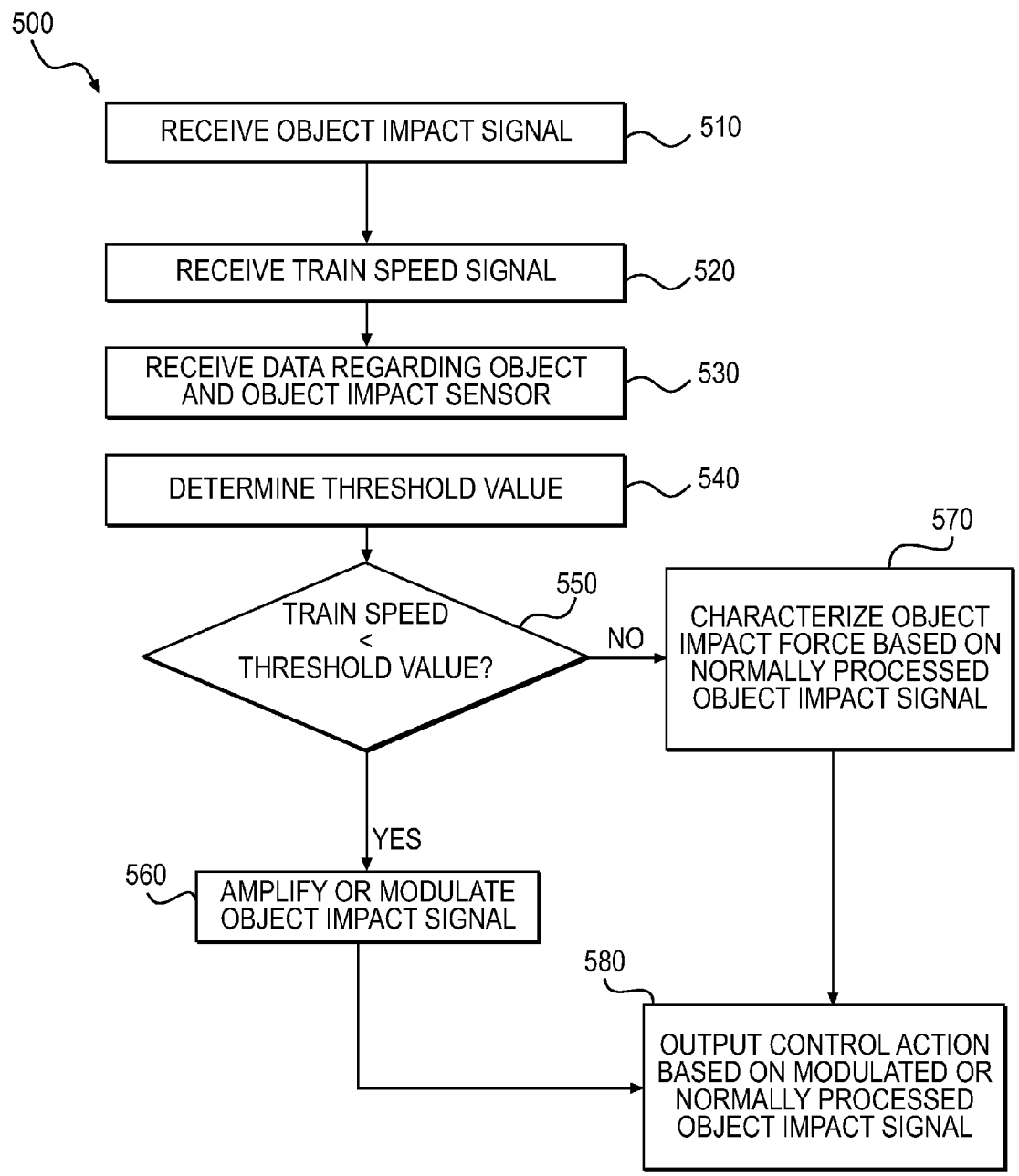
FIG. 5 is a flowchart depicting an exemplary disclosed method of speed-sensitive detection of dragging equipment using the exemplary apparatus of FIGS. 1, 2, and 3.

FIG. 5 is a flowchart depicting an exemplary disclosed method of speed-sensitive detection of dragging equipment using the exemplary apparatus discussed above.

INDUSTRIAL APPLICABILITY

The disclosed method and apparatus may allow for the detection of objects that are protruding beneath, hanging below, dragging beneath, or otherwise improperly extending from train 128 in the direction of train rails 122, 124, with train 128 traveling at a variety of different speeds. The disclosed method and apparatus may allow for detection of forces generated by the impact of dragging or protruding equipment 129 against inclined angle impact surfaces 103 of stationary impact elements 102, 104, 106, 108 when train 128 is traveling at the different speeds. At higher train speeds, a dragging object may impact a stationary impact element with a relatively larger force as a result of the relatively larger momentum even an object of relatively small mass may have at the higher speeds. At lower train speeds, the same object or another object of the same mass may impact the stationary impact element with a smaller force as a result of the lower momentum the object will have.

Therefore, CPU 220 may provide different procedures for processing signals indicative of forces generated by impact at train speeds above and below a threshold value. The different procedures may compensate for the lower momentum and resultant smaller force generated by an object impacting an impact element at a slower speed. In various implementations, a threshold value of 20 miles per hour (mph) may be selected. Signals indicative of impact forces at train speeds less than 20 mph would then be processed in accordance with procedures different from procedures for when train speeds are equal to or greater than 20 mph. This feature may allow the disclosed method and apparatus to provide accurate detection of impact forces over a wide range of train speeds. The threshold value for train speed may be varied depending on a number of parameters. In various alternative implementations, the threshold value may be adjusted automatically or manually in accordance with various linear or non-linear functions. For example, different threshold values may be provided for different ranges of train speeds. Threshold values could be adjusted continuously as train speed changes, or discretely at different levels, such as for every additional 20 mph. Additional factors that may be considered in determining the threshold value may include the type of object expected to be dragging beneath train 128, the type of impact sensor utilized, or the location of apparatus 100 along rails 122, 124, such as near a railroad crossing, in a switching yard, or out on a long stretch of rail where trains may be traveling at high speeds.

CPU 220 may assign a threshold value for an object that may be expected to impact impact elements 102, 104, 106, 108 as a function of the mass of the object. In particular, the assigned threshold value may be inversely proportional to the mass of the object. Objects with lower mass may have an assigned threshold value that is higher than the assigned threshold value for objects with larger mass. This is because at the same speed, the object with larger mass will generate a larger impact force than the object with smaller mass. CPU 220 may also determine the threshold value by reference to a look-up table of threshold values for various expected types of objects and types of impact sensors.

The procedures followed by CPU 220 for processing signals received from impact sensors 142, 144, 146, 148 when train 128 is traveling at speeds less than the threshold value may include modulating or amplifying the signals. An impact sensor designed to be used for detecting impact forces over a wide range of magnitudes of the impact forces may produce a small signal when detecting the small forces associated with slower train speeds. Therefore, amplification or modulation of the signals indicative of the impact forces may adjust or compensate for the smaller magnitude forces and allow the impact sensor to accurately characterize impact forces over a wider range of forces. At train speeds equal to or greater than the threshold value, CPU 220 may process the signals received from impact sensors 142, 144, 146, 148 using normal procedures without amplification or modulation. In alternative implementations, impact sensors 142, 144, 146, 148 may have adjustment means by which CPU 220 can adjust the sensitivity of the sensors when train speeds are below the threshold value. In further alternatives or variations, for example when impact sensors 142, 144, 146, 148 are more sensitive to detection of smaller impact forces, CPU 220 may process signals received from impact sensors 142, 144, 146, 148 using normal procedures without amplification or modulation when train speeds are less than the threshold value. In this situation CPU 220 may attenuate signals received from impact sensors 142, 144, 146, 148 when train speeds are equal to or greater than the threshold value. CPU 220 may achieve the desired processing of signals received from impact sensors 142, 144, 146, 148 using hard-wired circuitry, software, or some combination of circuitry and software.

As shown in FIG. 5, CPU 220 may perform operations 500 on the signals received from sensors 142, 144, 146, 148. At step 510, CPU 220 may receive one or more object impact signals from one or more of impact sensors 142, 144, 146, 148 indicative of a force generated by impact of object 129 with one or more of impact elements 102, 104, 106, 108. In various implementations, CPU 220 may filter out irrelevant data, such as signals that indicate an impact too small to be relevant to an identification of dragging equipment. CPU 220 may also determine the vertical and horizontal components of forces applied to impact elements 102, 104, 106, 108 as a result of dragging equipment or other improperly protruding objects 129 that may strike one or more inclined angle impact surfaces 103 of impact elements 102, 104, 106, 108 as train 128 travels over impact elements 102, 104, 106, 108.

At step 520, CPU 220 may receive signals from speed detectors 152, 154 indicative of the speed at which train 128 is traveling along rails 122, 124. At step 530, CPU 220 may receive data regarding dragging equipment or object 129 and object impact sensors 142, 144, 146, 148. The data received may be indicative of parameters of object 129 impacting impact elements 102, 104, 106, 108. Such data may include, for example, a magnitude or direction of force components generated by the impact, and operational characteristics of the impact sensor that detects the force components. In various exemplary implementations, CPU 220 may distinguish certain types of dragging equipment such as air hoses or brake lines from other types of protruding equipment such as a hanging door on a hopper car, based on the resultant force components from impact. CPU 220 may also identify specific forces as having been caused by specific types of dragging equipment, improperly protruding equipment, flat wheels, or other conditions. For example, CPU 220 may identify an impact force having a large vertical component, a small or non-existent horizontal component, and a short duration, as being an impact force caused by a flat wheel. The flat wheel may result in a vibration or acceleration transferred through rails 122, 124, through frame 136, and into impact elements 102, 104, 106, 108. Alternatively, a portion of the train wheel or other component may strike nearly vertically down on an impact element 102, 104, 106, 108 as train 128 passes over the impact element, particularly if the flat wheel results in at least a partial derailment. CPU 220 may also use this information, along with information on the particular type of impact sensor that detected the impact, in determining how much weight to give to inputs from various sensors including speed detectors 152, 154 or impact sensors 142, 144, 146, 148. In various alternative implementations, the order in which steps 510, 520, and 530 are performed may be changed. For example, the train speed signal may be received before the object impact signal. One of ordinary skill in the art will recognize that speed detectors 152, 154 may be providing signals indicative of the speed of train 128 for periods of time when no impacts occur, and therefore no signals are being received from impact sensors 142, 144, 146, 148.

At step 540, CPU 220 may determine a threshold value based on the speed of train 128, and in view of other parameters such as those discussed above. The threshold value may be a speed of train 128 below which special processing of the input from impact sensors 142, 144, 146, 148 is performed in order to compensate for the proportionately reduced magnitude of impact forces. As discussed above, one exemplary implementation may include CPU 220 selecting a threshold value of approximately 20 mph. One of ordinary skill in the art will recognize that other threshold values may be selected. Selection of a threshold value may include evaluating a type of object expected to impact one or more of impact elements 102, 104, 106, 108. As discussed above, parameters affecting the selection of the threshold value may include the mass of an object expected to impact an impact element 102, 104, 106, 108. Expectations of the types of objects that may impact can be based on past experiences, the mechanical structure of certain types of train equipment, the frequency at which types of train equipment are connected and disconnected, and other factors that may affect the likelihood of a particular type of train equipment dragging beneath a train.

At step 550, CPU 220 may compare train speed as identified by speed detectors 152, 154 to the threshold value determined in step 540, and implement different processing procedures to the signals received from impact sensors 142, 144, 146, 148 depending on the results of the comparison.

At step 560, CPU 220 may amplify or modulate the signals received from impact sensors 142, 144, 146, 148 if the train speed is less than the threshold (Step 550: Yes). At step 570, CPU 220 may perform normal processing without amplification or modulation of signals received from impact sensors 142, 144, 146, 148 if the train speed is equal to or greater than the threshold (Step 550: No).

At step 580, CPU 220 may output control actions based on amplified or modulated object impact signals received from impact sensors 142, 144, 146, 148 when the train speed is less than the threshold value, or output control actions based on normally processed object impact signals received from impact sensors 142, 144, 146, 148 when the train speed is equal to or greater than the threshold value. Control actions may include scheduling maintenance specific to the type of impact detected. CPU 220 may also store data that associates the detected impact with a specific location on train 128, such as identifying the impact as having been caused by a specific wheel on a particular train car. In one exemplary implementation, CPU 220 may be configured to characterize an impact having specific parameters, such as horizontal force components greater than vertical force components, as having been caused by a dragging air line or brake line. In other various exemplary implementations, CPU 220 may compare the direction, magnitude, frequency, and other parameters of the detected force components to force components known to result from impacts with dragging equipment or objects that have been assessed as presenting potential problems. CPU 220 may be configured to implement control actions in these types of situations that may include immediately initiating braking, sending an urgent message to a central control location or dispatch center, or communicating the situation directly to onboard train crew.

Based on an evaluation of the signals received from impact sensors 142, 144, 146, and 148, CPU 220 may distinguish the types of control action that may be taken as a result of the impacts detected. In one exemplary implementation, CPU 220 may identify an impact having specific characteristics, such as primarily vertical components of a certain magnitude, as having been caused by a flat wheel. In this exemplary implementation, CPU 220 may take the control action of scheduling maintenance specific to that type of impact, and may also store data that associates the detected impact with a specific location on the train, such as identifying the impact as having been caused by a specific wheel.

CPU 220 may also evaluate other input parameters including train car identification, GPS location information, location relative to stationary position sensors, or location relative to wayside stations, and record this information to provide an accurate identification of where a sensed impact took place, and where the dragging equipment 129 was located. Under other circumstances, CPU 220 may identify a different combination of vertical and horizontal force components of a different magnitude, duration, or amplitude, and as a result initiate a different control action, such as autonomously stopping the train, or sending a signal to a train operator. CPU 220 may also store data characteristic of different impacts on impact elements 102, 104, 106, 108, including the frequency of certain types of impacts, and any relationship between other train operating parameters, such as speed, procedures followed during switching of trains in train yards, or procedures followed during loading and unloading of train cars, and the frequency or type of impacts. This type of data stored by CPU 220 may assist in establishing procedures that can result in a reduction of the frequency of impacts by dragging equipment or other objects.

It will be apparent to those skilled in the art that various modifications and variations can be made to the disclosed speed-sensitive dragging equipment system without departing from the scope of the disclosure. Other embodiments of the dragging equipment system will be apparent to those skilled in the art from consideration of the specification and practice of the dragging equipment system disclosed herein. It is intended that the specification and examples be considered as exemplary only, with a true scope of the disclosure being indicated by the following claims and their equivalents.

What is claimed is:

1. A method of detecting an object beneath a train, the method comprising:
   receiving a first signal indicative of a position of the train;
   receiving a second signal indicative of a force generated by impact of the object with an impact element;
   determining a speed of the train;
   selecting a threshold speed value based on the speed of the train;
   processing said second signal in accordance with a first procedure if the speed of the train is less than the threshold speed value; and
   processing said second signal in accordance with a second procedure different from said first procedure if the speed of the train is equal to or greater than the threshold speed value, wherein the first procedure and the second procedure are selected based on a sensitivity of the impact element.

2. The method of claim 1, wherein the threshold speed value is 20 miles per hour.

3. The method of claim 1, wherein said first procedure includes amplifying said second signal.

4. The method of claim 1, wherein said second procedure includes attenuating said second signal.

5. The method of claim 1, wherein receiving said second signal includes receiving an acceleration signal.

6. The method of claim 1, wherein selecting a threshold value includes evaluating a type of object expected to impact the impact element.

7. The method of claim 1, wherein selecting a threshold speed value includes evaluating a mass of the object.

8. An apparatus for detecting an object beneath a train, the apparatus comprising:
   an impact element configured to be disposed in a path of the object;
   a sensor configured to sense an impact on the impact element;
   a sensor configured to detect speed of the train; and
   a processor configured to:
      receive a first signal from the sensor indicative of a force generated by impact of the object with the impact element;
      receive a second signal from the sensor indicative of the position of the train;
      determine a threshold speed value based on the speed of the train,
      implement a first procedure on said first signal when the speed of the train is less than said threshold speed value; and
      implement a second procedure different from said first procedure on said first signal when the speed is equal to or greater than said threshold speed value, wherein the first procedure and the second procedure are selected based on a sensitivity of the impact element.

9. The apparatus of claim 8, wherein the processor is configured to implement the first procedure by modulating the first signal to enable detection of forces generated by impact of the object with the impact element when the train is traveling at speeds between approximately 1 mile per hour and approximately 20 miles per hour.

10. The apparatus of claim 8, wherein the sensor is an accelerometer.

11. The apparatus of claim 8, wherein the processor is configured to implement the first procedure by amplifying the first signal.

12. The apparatus of claim 8, wherein the processor is configured to implement the first procedure by increasing sensitivity of the sensor.

13. The apparatus of claim 8, wherein:
   the sensor is mounted on the impact element; and
   the impact element extends in a direction approximately orthogonal to a travel direction of the train.

14. The apparatus of claim 13, wherein:
   the impact element is stationary; and
   the sensor is adapted to sense accelerations in the stationary impact element caused by the impact.

15. The apparatus of claim 8, wherein the processor is configured to determine the threshold speed value based on the position of the train and a type of the object expected to impact the impact element.

16. The apparatus of claim 15, wherein the processor is configured to assign a threshold speed value for an object as a function of a mass of the object.

17. The apparatus of claim 15, wherein the processor is configured to determine the threshold speed value by reference to a look-up table of threshold values for various expected types of objects and types of sensors.

18. The apparatus of claim 8, wherein the sensor is a transducer that uses the piezoelectric effect to generate charges proportional to accelerations generated by the impact of the object with the impact element.

19. A method of detecting an object beneath a train, the method comprising:
   receiving a first signal indicative of a position of the train;
   receiving a second signal indicative of a force generated by impact of the object with an impact element;
   determining a speed of the train;
   selecting a threshold level of the speed based on the speed of the train;
   comparing said speed of the train with said threshold level;
   amplifying said second signal when said speed is less than the threshold level of speed and the impact element has a first sensitivity; and
   attenuating said second signal when said speed is approximately equal to or greater than the threshold level of speed and the impact element has a second sensitivity greater than the first sensitivity.

20. The method of claim 15, wherein the processor is configured to determine the type of the object expected to impact the impact element based on one or more of historical data, a mechanical structure of train equipment, and a frequency at which the train equipment is connected and disconnected.

* * * * *